US009712320B1

(12) United States Patent
Kiayias et al.

(10) Patent No.: US 9,712,320 B1
(45) Date of Patent: Jul. 18, 2017

(54) DELEGATABLE PSEUDORANDOM FUNCTIONS AND APPLICATIONS

(71) Applicant: EMC Corporation, Hopkinton, MA (US)

(72) Inventors: Aggelos Kiayias, Athens (GR); Stavros Papadopoulos, Kowloon (HK); Nikolaos Triandopoulos, Arlington (MA); Thomas Megas Zacharias, Athens (GR)

(73) Assignee: EMC IP Holding Company LLC, Armonk, NY (US)

( * ) Notice: Subject to any disclaimer, the term of this patent is extended or adjusted under 35 U.S.C. 154(b) by 577 days.

(21) Appl. No.: 13/931,939

(22) Filed: Jun. 30, 2013

Related U.S. Application Data (60) Provisional application No. 61/833,671, filed on Jun. 11, 2013.

(51) Int. Cl.
*H04L 9/00* (2006.01)
*H04L 9/08* (2006.01)

(52) U.S. Cl.
CPC .................................. *H04L 9/0816* (2013.01)

(58) Field of Classification Search
CPC ....... H04L 9/0662; H04L 9/0869; H04L 9/22; H04L 9/18; H04L 9/26; G06F 7/582; G06F 7/58
USPC .................... 380/46; 370/204; 723/150–194; 713/150–194
See application file for complete search history.

(56) References Cited

U.S. PATENT DOCUMENTS

| 6,834,272 B1 * | 12/2004 | Naor ................... G06Q 20/0855 380/255 |
| 9,008,303 B1 * | 4/2015 | Juels et al. ....................... 380/44 |
| 2003/0177352 A1 * | 9/2003 | Camenisch ........... H04L 9/3255 713/158 |

(Continued)

OTHER PUBLICATIONS

Ateniese et al. Improved Proxy Re-Encryption Schemes with Applications to Secure Distributed Storage, ACM TISSEC, 9(1):1-30, 2006.

(Continued)

*Primary Examiner* — Evans Desrosiers
(74) *Attorney, Agent, or Firm* — Ryan, Mason & Lewis, LLP (57) ABSTRACT

Techniques are provided for delegating evaluation of pseudorandom functions to a proxy. A delegator delegates evaluation of a pseudorandom function to a proxy, by providing a trapdoor τ to the proxy based on a secret key k and a predicate P using an algorithm T, wherein the predicate P defines a plurality of values for which the proxy will evaluate the pseudorandom function, wherein the plurality of values comprise a subset of a larger domain of values, and wherein the trapdoor τ provides an indication to the proxy of the plurality of values. A proxy evaluates a pseudorandom function delegated by a delegator by receiving a trapdoor τ from the delegator that provides an indication of a plurality of values to be evaluated, wherein the plurality of values comprise a subset of a larger domain of values; and evaluating an algorithm C on the trapdoor τ to obtain the pseudorandom function value for each of the plurality of values. The trapdoor τ can be provided to the proxy using a Gordreich, Goldwasser, Micali (GGM) binary tree representation.

36 Claims, 6 Drawing Sheets

(56) References Cited

U.S. PATENT DOCUMENTS

| | | | |
|---|---|---|---|
| 2005/0063545 A1* | 3/2005 | Fujimoto | G06F 21/64 380/277 |
| 2009/0070361 A1* | 3/2009 | Haber | G06F 21/6254 |
| 2009/0254971 A1* | 10/2009 | Herz et al. | 726/1 |
| 2009/0320118 A1* | 12/2009 | Muller | G06F 21/34 726/9 |
| 2011/0010549 A1* | 1/2011 | Kolesnikov | H04L 63/061 713/171 |
| 2012/0297201 A1* | 11/2012 | Matsuda | G06F 21/6245 713/189 |
| 2013/0262852 A1* | 10/2013 | Roeder | G06F 21/602 713/150 |

OTHER PUBLICATIONS

Barth et al., Privacy in Encrypted Content Distribution Using Private Broadcast Encryption, in Financial Cryptography, pp. 52-64, 2006.
Blaze et al., Divertible Protocols and Atomic Proxy Cryptography, in EUROCRYPT, 1998.
Boldyreva et al., Secure Proxy Signature Schemes for Delegation of Signing Rights, Journal of Cryptology, 25:57-115, 2012.
Chung et al., Improved Delegation of Computation Using Fully Homomorphic Encryption, in CRYPTO, pp. 483-501, 2010.
Curtmola et al., Searchable Symmetric Encryption: Improved Definitions and Efficient Constructions, in CCS, 2006.
Dodis et al., A Verifiable Random Function with Short Proofs and Keys, in PKC, pp. 416-431, 2005.
Fazio et al., Outsider-Anonymous Broadcast Encryption with Sublinear Ciphertexts, in PKC, 2012.
Fiat et al., Broadcast Encryption, in CRYPTO, pp. 480-491, 1993.
Fiore et al., Publicly Verifiable Delegation of Large Polynomials and Matrix Computations, with applications, in CCS, pp. 501-512, 2012.
Freedman et al., Keyword Search and Oblivious Pseudorandom Functions, in TCC, pp. 303-324, 2005.
Goldreich et al., How to Construct Random Functions, J. ACM, 33(4):792-807, 1986.
Goldwasser et al., Delegating Computation: Interactive Proofs for Muggles, in STOC, 2008.
Green et al., Identity-Based Proxy Re-Encryption, ACNS, 2007.
Hohenberger et al., How to Securely Outsource Cryptographic Computations, in TCC, 2005.
Ivan et al., Proxy Cryptography Revisited, in NDSS, 2003.
Jarecki et al., Efficient Oblivious Pseudorandom Function with Applications to Adaptive of and Secure Computation of Set Intersection, in TCC, pp. 577-594, 2009.
Kamara et al., Dynamic Searchable Symmetric Encryption, in CCS, 2012.
Libert et al., Anonymous Broadcast Encryption: Adaptive Security and Efficient Constructions in the Standard Model, in PKC, 2012.
Luby et al., Combinatorial Bounds for Broadcast Encryption, in EUROCRYPT, pp. 512-526, 1998.
Lysyanskaya, Unique Signatures and Verifiable Random Functions from the DH-DDH Separation, in CRYPTO, 2002.
Micali et al., Verifiable Random Functions, in FOCS, pp. 120-130, 1999.
Molnar et al., A Scalable, Delegatable Pseudonym Protocol Enabling Ownership Transfer of RFID Tags, in SAC, pp. 276-290, 2006.
Naor et al., Revocation and Tracing Schemes for Stateless Receivers, in CRYPTO, 2001.
Parno et al., How to Delegate and Verify in Public: Verifiable Computation from Attribute-Based Encryption, in TCC, pp. 422-439, 2012.
Attallah et al., Securely Outsourcing Linear Algebra Computations, in ASIACCS, pp. 48-59, 2010.
Benabbas, et al., Verifiable Delegation of Computation over Large Datasets, in Crypto, pp. 111-131, 2011.
Canetti et al., Practical Delegation of Computation using Multiple Servers, in CCS, pp. 445-454, 2011.
Itkis, Handbook of Information Security, Forward Security J. Wiley & Sons, 2006.
Mambo et al., Proxy Signatures for Delegating Signing Operation, in CCS, pp. 48-57, 1996.
Naor et al., Efficient Trace and Revoke Schemes, Int. J. Inf. Sec., 9(6):411-424, 2010.
Robert Pepper, What is SIP Proxy Server?, https://getvoip.com/library/what-is-a-sip-proxy-server/, Aug. 23, 2012, pp. 1-3.
Goldreich et al. Enhancements of Trapdoor Permutations, Electronic Colloquium on Computational Complexity, Report No. 159 (2011), pp. 1-24.

* cited by examiner

DPRF Security Game $G_{SEC}^{\mathcal{A}}(1^\lambda)$

1. The challenger $\mathcal{C}$ selects $k$ from $\mathcal{K}$.
2. The adversary $\mathcal{A}$ is allowed to interact with $\mathcal{C}$ and ask two types of queries:
   (a) PRF queries for a value $x \in \mathcal{A}$; to those queries $\mathcal{C}$ responds with $f_k(x)$ and add the value $x$ to a set $L_{que}$.
   (b) delegation queries for a policy predicate $P \in \mathcal{P}$; to those queries $\mathcal{C}$ respond with $\tau \leftarrow T(P, k)$ and adds $P$ to a set $L_{pol}$.
3. The adversary $\mathcal{A}$ submits a challenge query $x^*$ to which the challenger $\mathcal{C}$ responds as follows: it flips a coin $b$ and if $b = 1$ it responds with $y^* = f_k(x^*)$, otherwise responds with a random value $y^*$ from $\mathcal{B}$.
4. The adversary $\mathcal{A}$ continues as in step 2.
5. The adversary $\mathcal{A}$ terminates by returning a single bit $\tilde{b}$. Subsequently the game returns a bit which is 1 if and only the following holds true:

$$(b = \tilde{b}) \wedge (x^* \notin L_{que} \vee (\ \forall P \in L_{pol}: \neg P(x^*)).$$

FIG. 3

*DPRF Policy Privacy Security Game* $G_{PP}^{\mathcal{A}}(1^\lambda)$

1. The challenger $\mathcal{C}$ selects $k$ from $\mathcal{K}$.
2. The adversary $\mathcal{A}$ is allowed to interact with $\mathcal{C}$ and ask the two types of queries as in the case of the DPRF security game $G_{SEC}^{\mathcal{A}}$.
3. The adversary $\mathcal{A}$ submits two policy predicates $P_0, P_1$ to $\mathcal{C}$. The challenger flips a bit $b$ and computes $\tau^* \leftarrow T(P_b, k)$. It returns $\tau^*$ to the adversary.
4. The adversary continues as in step 2 and terminates returning a bit $\tilde{b}$. |The game terminates with 1 provided that $$(b = \tilde{b}) \wedge (|A_{P_0}| = |A_{P_1}|) \wedge (A_{P_0} \neq A_{P_1}) \wedge$$
$$\wedge \forall \alpha \in L_{que} : \alpha \notin (A_{P_0} \triangle A_{P_1}) \wedge$$
$$\wedge \forall P \in L_{pol} : A_P \cap (A_{P_0} \triangle A_{P_1}) = \emptyset.$$

| The Trapdoor Generation Algorithm $T$ in BRC |
|---|
| Input: $a, b : 0 \leq a < b \leq a + \lambda^\gamma \leq 2^n - 1$ and $k \in \{0,1\}^\lambda$ <br> Output: Trapdoor $\tau$ for computing the PRFs for $[a,b]$ |

1. $\tau \leftarrow \langle \rangle$
2. $t \leftarrow \max\{i \mid a_i \neq b_i\}$
3. if $(\forall i \leq t : a_i = 0)$ then
4.     Append $(f_k(a_{n-1} \ldots a_t), t)$ to $\tau$
5. else
6.     $\mu \leftarrow \min\{i \mid i < t \wedge a_i = 1\}$
7.     for $i = t - 1$ to $\mu + 1$
8.         if $a_i = 0$ then
9.             Append $(f_k(a_{n-1} \ldots a_{i+1}1), i)$ to $\tau$
10.     Append $(f_k(a_{n-1} \ldots a_\mu), \mu)$ to $\tau$
11. if $(\forall i \leq t : b_i = 1)$ then
12.     Append $(f_k(b_{\nu-1} \ldots b_t), t)$ to $\tau$
13. else
14.     $\nu \leftarrow \min\{i \mid i < t \wedge b_i = 0\}$
15.     for $i = t - 1$ to $\nu + i$
16.         if $b_i = 1$ then
17.             Append $(f_k(b_{n-1} \ldots b_{i+1}0), i)$ to $\tau$
18.     Append$(f_k(b_{n-1} \ldots b_\nu), \nu)$ to $\tau$
19. return $\tau$

FIG. 6
600

| The Trapdoor Generation Algorithm $T$ in URC |
|---|
| Input: $a, b : 0 \leq a < b \leq a + \lambda^7 \leq 2^n - 1$ and $k \in \{0,1\}^\lambda$ <br> Output: Trapdoor $\tau$ for computing the PRFs for $[a,b]$ |
| 1. Invoke $\tau = T(a,b,k) = \langle (y_1, d_1),...,(y_n, d_m) \rangle$ from BRC <br> 2. Let $D = ((d_1,...,d_c), (d_{c+1},...,d_m))$ be the corresponding decomposition of $r = b - a + 1$ <br> 3. while there is a maximum integer $x$ in $\{0,...,M_D\}$ that does not appear in $D$: <br> 4.     Find the rightmost pair $(y_i, x+1)$ and compute values $y_i^0 = G_0(y_i)$, $y_i^1 = G_1(y_i)$ <br> 5.     Remove $(y_i, x+1)$ from $\tau$, properly insert the pairs $(y_i^0, x)$ and $(y_i^1, x)$ in $\tau$ respecting the definition of the decomposition and update $D$ accordingly <br> 6. If the leftmost sequence of $D$ is not $(B(r),...,0)$ then <br> 7.     Arrange $\tau$ according to the uniform decomposition of $r$ <br> 8. return $\tau$ |

DELEGATABLE PSEUDORANDOM FUNCTIONS AND APPLICATIONS

CROSS-REFERENCE TO RELATED APPLICATION

The present application claims priority to U.S. Provisional Patent Application Ser. No. 61/833,671, filed Jun. 11, 2013, entitled "Delegatable Pseudorandom Functions and Applications," incorporated by reference herein.

FIELD OF THE INVENTION

The present invention relates generally to techniques for generating pseudorandom numbers and more particularly, to techniques for delegating evaluation of pseudorandom functions to a proxy.

BACKGROUND OF THE INVENTION

The problem of securely delegating computational tasks to untrusted third parties comprises a particularly active research area. Generally speaking, secure delegation involves the design of protocols that allow the controlled authorization for an otherwise untrusted party to compute a given function while achieving some target security property (e.g., the verifiability of results or privacy of inputs/outputs) and also preserving the efficiency of the protocols so that the delegation itself remains meaningful. A number of specific cryptographic primitives have been considered in this context.

U.S. patent application Ser. No. 13/334,709, filed Dec. 23, 2011, entitled "Methods and Apparatus for Generating Forward Secure Pseudorandom Numbers," (now U.S. Pat. No. 9,008,303), incorporated by reference herein, discloses forward-secure pseudorandom generators (FS-PRNGs) that are forward secure as well as efficient with respect to their key-update processes. Pseudorandom functions (PRFs) are a fundamental primitive for emulating perfect randomness via keyed functions that find numerous applications in information security. Nonetheless, PRFs have not been provided in the context of delegation of computations (of PRF values).

Thus, a need remains for a delegatable pseudorandom function (DPRF) cryptographic primitive that enables the delegation of the evaluation of a pseudorandom function (PRF) to a proxy according to a given predicate that defines the inputs on which the proxy will evaluate the PRF.

SUMMARY OF THE INVENTION

The present invention in the illustrative embodiments described herein provides techniques for delegating evaluation of pseudorandom functions to a proxy. According to one aspect of the invention, a delegator delegates evaluation of a pseudorandom function to a proxy, by computing a trapdoor $\tau$ based on a secret key k and a predicate P using an algorithm T, wherein the predicate P defines a plurality of values for which the proxy will evaluate the pseudorandom function, wherein the plurality of values comprise a subset of a larger domain of values; and providing the trapdoor $\tau$ to the proxy, wherein the trapdoor $\tau$ provides an indication to the proxy of the plurality of values.

According to another aspect of the invention, a proxy evaluates a pseudorandom function delegated by a delegator, by receiving a trapdoor $\tau$ from the delegator, wherein the trapdoor $\tau$ provides an indication of a plurality of values to be evaluated, wherein the plurality of values comprise a subset of a larger domain of values; and evaluating an algorithm (C on the trapdoor $\tau$ to obtain the pseudorandom function value for each of the plurality of values. In one exemplary implementation, the algorithm C starts from the trapdoor $\tau$, executes a number of steps to compute at least one pseudorandom function value for each of the plurality of values and terminates when the algorithm C reaches a final state.

The pseudorandom function optionally generates a pseudorandom function value for any of the plurality of values conforming to the predicate P. In one exemplary implementation, the pseudorandom function value for any value in the larger domain of values that is not within the plurality of values is unpredictable. In addition, the proxy optionally cannot infer information about (i) the predicate P from the trapdoor $\tau$ that is not inferred directly by the set of generated pseudorandom function values; or (ii) the larger domain of values not within the plurality of values from the trapdoor $\tau$.

According to yet another aspect of the invention, the trapdoor $\tau$ is provided to the proxy using a Gordreich, Goldwasser, Micali (GGM) binary tree representation. For example, leaf labels of the GGM binary tree representation can comprise the larger domain and every leaf is associated with a pseudorandom function value of its label. A minimum number of sub-trees in the GGM tree that cover a given range of the predicate P is optionally determined. The trapdoor $\tau$ can be represented by the root nodes of at least two sub-trees in the GGM binary tree representation and the proxy can evaluate pseudorandom functions for leaves within the at least two sub-trees. In another variation, a minimum number of sub-trees in the GGM tree that cover a given range of the predicate P is determined, wherein at least two of the sub-trees are anchored on the same level of the GGM tree.

In one embodiment, the delegator comprises a trusted center and the proxy comprises a radio frequency identification reader and the delegation apparatus is performed for one or more of authentication and access control. In another embodiment, the delegator comprises a symmetric searchable encryption (SSE) client and the proxy comprises an SSE server and the delegation apparatus is performed to generate one or more query tokens. In a further embodiment, the delegation comprises a key assignment mechanism for a broadcast encryption scheme.

The delegation techniques of the illustrative embodiments overcome one or more of the problems associated with the conventional techniques described previously, and permit secure delegation of pseudorandom function evaluation to a proxy. Moreover, no modification of the applications or communication protocols is required. These and other features and advantages of the present invention will become more readily apparent from the accompanying drawings and the following detailed description.

DETAILED DESCRIPTION

The present invention provides methods and apparatus for delegating evaluation of pseudorandom functions to a proxy. Furthermore, aspects of the present invention provide a delegatable pseudorandom function (DPRF) cryptographic primitive that enables the delegation of the evaluation of a pseudorandom function (PRF) to an untrusted proxy according to a given predicate that defines the inputs on which the proxy will evaluate the PRF.

Specifically, let F be a PRF family, and P a set of predicates, called the delegation policy, defined over the domain of F. A DPRF is a triplet (F,T,C) constructed with respect to P, that provides the elementary functionality shown in FIG. 1. For any secret key k and a predicate $P \in P$, a delegator 110 computes a trapdoor $\tau$ via algorithm T, and $\tau$ is transmitted to a proxy 120. The latter then runs algorithm C on $\tau$ to finally derive exactly the set of PRF values $V_P = \{f_k(x)|P(x)\}$, where $f_k \in F$, i.e., the PRF value on every input x satisfying predicate P, overall correctly enabling the evaluation of PRF $f_k$ subject to predicate P without explicit knowledge of secret key k (or even the input values $A_P = \{x|P(x))\}$).

Figure 1:
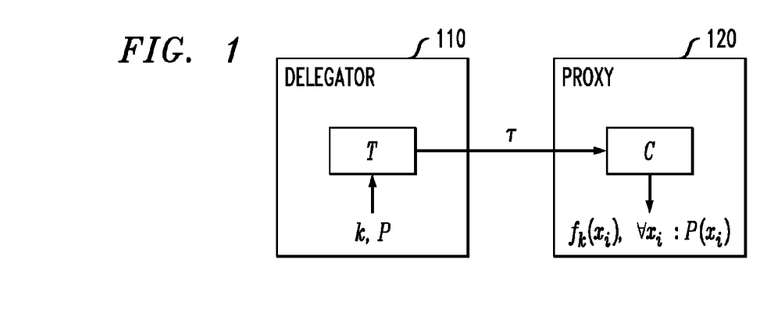
FIG. 1 illustrates a delegator that delegates evaluation of pseudorandom functions to a proxy in accordance with aspects of the present invention.

The above scheme is motivated by efficiency. As long as the trapdoor $\tau$ is sublinear in the size $n=|\{x|P(x)\}|$ of delegated PRF values, the delegation is meaningful as the delegator 110 conserves resources (or otherwise the proxy 120 could be provided directly with the n PRF values in the delegated set $V_P = \{f_k(x)|P(x)\}$).

At the same time, the DPRF must retain the security properties of the underlying PRF, namely, (i) pseudorandomness for any value x conforming to the delegation predicate P, i.e., P(x), and (ii) unpredictability for any nonconforming value x such that $\neg P(x)$. In addition, a DPRF can optionally satisfy a policy privacy property that prevents the proxy 120 from inferring information about P or the delegated set $\{x|P(x)\}$ from the trapdoor $\tau$.

An exemplary formal definitional framework is provided for the new primitive of DPRFs, capturing the above technical requirements. Correctness captures the ability of the proxy 120 to successfully evaluate the PRF on exactly those inputs specified by predicate P. Security captures the requirement that the delegation capabilities of the PRF do not compromise its core pseudorandomness property, but this condition goes beyond the standard security definition of PRFs since the pseudorandomness attacker may now adaptively query a trapdoor delegation oracle with policies of its choice.

Equally important is also a policy privacy property that a DPRF may optionally satisfy, intuitively capturing the inability of a malicious proxy 120 to learn any (non-trivial) property about the delegation set $A_P = \{(x|P(x)\}$ (that is not implied by set $V_P$). The security notion postulates that any two policies P, P' are indistinguishable provided that $|A_P|=|A_{P'}|$, and no PRF queries are obtained in the symmetric difference of $A_P, A_{P'}$ (a necessary condition).

GGM-Based Realization for Range Predicates

Two efficient and secure DPRF constructions are provided for the case where the delegation policy contains predicates described by one-dimensional ranges. Range-based policy predicates is an interesting use case as many applications maintain an ordering over the PRF inputs and delegation rights are defined with respect to ranges of such inputs.

A first DPRF scheme is referred to as a best range cover (BRC), and relies on the well-known Gordreich, Goldwasser, Micali (GGM) PRF family. See, e.g., O. Goldreich et al., "How to Construct Random Functions," J. ACM, 33(4):792-807 (1986). This family defines a PRF based on the hierarchical application of any length-doubling pseudorandom generator (PRG) according to the structure induced by a tree, where input values are uniquely mapped to root-to-leaf paths. By leveraging the above characteristics, the disclosed BRC scheme features logarithmic delegation size in the number of values conforming to the policy predicate simply by having the trapdoor $\tau$ comprising a subset $G_P$ of PRG values that (almost optimally) cover the target range $V_P$ of PRF values.

The disclosed BRC scheme may not satisfy policy privacy as the structure of intermediate PRG values in $G_P$ leaks information about predicate P. This motivates a second construction, referred to as uniform range cover (URC). This URC scheme augments BRC in a way that renders all trapdoors corresponding to ranges of the same size indistinguishable. This is achieved by having $\tau$ comprising a subset $G_P'$ of PRG values that cover the target range $V_P$ of PRF values less optimally: $G_P'$ contains PRG values that are descendants of those values in $G_P$ at a tree height that depends solely on $|V_P|$ (which by definition leaks to the adversary). More interestingly, by adopting the above change, URC retains both the asymptotic logarithmic communication complexity of BRC and its DPRF security, but it achieves a policy privacy notion appropriately relaxed to the current setting of range predicates. Inherently, no tree-based DPRF scheme can satisfy the initial version of policy privacy, thus a sufficient relaxation is employed, referred to as a union policy privacy.

Main Applications

Finally, the disclosed DPRF schemes, equipped with efficiency, security and policy privacy, lend themselves to new schemes that provide scalable solutions to a wide range of information security and applied cryptography settings that involve the controlled authorization of PRF-based computations. Generally, DPRFs are particularly useful in applications that rely on the evaluation of (secret) key-based cryptographic primitives on specific inputs (according to an underlying policy): Using a DPRF scheme then allows a cost-efficient, yet secure and private, key management for an untrusted proxy 120 who is otherwise capable in executing a particular computational task of interest.

There are a number of applications in which DPRFs are useful, including authentication and access control in RFIDs, efficient batch querying in searchable encryption as well as broadcast encryption. Due to the underlying GGM building component, the disclosed DPRFs are extremely lightweight, as their practical implementation entails a few repeated applications of any efficient candidate instantiation of a PRG (e.g., HMAC or block ciphers).

According to one aspect of the invention, delegatable PRFs (DPRFs) are provided. A definitional framework is provided for the new DPRF primitive, capturing properties such as efficiency, correctness, security and policy privacy, and also offering a relaxed union policy privacy that is arguably necessary for a wide DPRF class with range-based policies.

According to another aspect of the invention, a framework is provided for constructing DPRF schemes for the important case where the delegation policy is governed by range predicates over inputs. The disclosed framework augments the generic GGM construction framework discussed above to provide two concrete DPRF schemes, namely schemes BRC and URC.

DEFINITIONS

A pseudorandom function family (PRF) F is a family of functions $\{f_k:A \to B | k \in K\}$ so that K is efficiently samplable and all F, K, A, B are indexed by a security parameter $\lambda$. The security property of a PRF is as follows: for any probabilistic polynomial-time (PPT) A running in time polynomial in $\lambda$ it holds that $$|Pr[A^{f_k(\cdot)} == 1] - Pr[A^{R(\cdot)} = 1]| = \text{negl}(\lambda),$$

where negl denotes a negligible function and the probability above is taken over the coins of A and the random variables k and R which are uniform over the domains K and (A→B) respectively.

Delegatable PRFs

The notion of delegation for PRFs is defined with respect to a delegation policy P, i.e. P is a set of predicates defined over A, also indexed by $\lambda$, where each predicate P has an efficient public encoding, so that the set of elements in A that satisfy P, denoted as $A_P = \{x \in A | P(x)\}$, is efficiently derived.

Definition 1 (Delegatable PRF) A triple (F, T, C) is called a delegatable PRF (DPRF) with respect to policy P provided it satisfies two properties, correctness and security, that are defined individually below.

Correctness–T is a PPT algorithm such that given a description of P∈P and a key k∈K, it outputs a "trapdoor" $\tau$ intended to be used along with the deterministic PT algorithm C for the computation of every element of A that satisfies the predicate P. For fixed P,k, the algorithm C can be considered as a function $$C: St_{P,k} \to B \times St_{P,k},$$

where $St_{P,k}$ is a set of states and the output C(s) is a pair that consists of a PRF value and a (new) state. The domain and range of C are augmented with a special value ⊥ that will be used to denote the final state. $C(s) = \langle C_L(s), C_R(s) \rangle$ and define recursively the set of reachable states from a subset S of $St_{P,c}$ as $$R_{(S)} \triangleq S \cup R_{(C_R(S))}.$$

The elements of the DPRF that are produced given an initial state s will be defined using the complete set of reachable states given s. A set S is R-closed provided it holds R(S)=S. For a singleton S={s}, R(s) is written instead of R({s}), and R(s) denotes the closure of s under R, i.e., the fixpoint of the recursive equation for R that also contains s.

Definition 2 (Correctness) The DPRF scheme (F, T, C) is correct for a policy P if for every P,k:
1. $\{\tau | \tau \leftarrow T(P,k)\} \cup \{\bot\} \subseteq St_{P,k}$.
2. $C_R(\bot) = \bot$ (termination condition).
3. There exists a polynomial $p_1$ s.t. $|A_P| \leq p_1(\lambda)$.
4. There exists a polynomial $p_2$ s.t. for every $\tau \leftarrow T(P,k)$:
   [(i)]
   (a) $\bot \in R(\tau)$ (termination guarantee).
   (b) $|R(\tau)| \leq p_2(|A_P|)$ (efficiency).
   (c) $\{f_k(x) | P(x)\} = f_k(A_P) = \{C_L(s) | s \in R(\tau)\}$ (completeness).

According to the above exemplary conditions, all possible trapdoors corresponding to a certain policy predicate P are valid initial inputs for C. Starting from an arbitrary trapdoor for P, the proxy 120 can execute a number of steps, compute the DPRF image of every argument x that fulfills P), and terminate when it reaches the final state ⊥, where no further useful information can be derived.

The condition 3 of correctness stems from the fact that the setting is considered where the proxy 120 wishes to eventually compute all the delegated PRF values. If this is not necessary (or desirable) for the DPRF application, the condition can be relaxed to any size of $A_P$ (including super-polynomial sizes). In this case, completeness (item 4(iii) above) will have to be relaxed as well since the proxy 120 cannot hope to be able to compute all the delegated PRF values. There are a number of ways to capture this by suitably modifying the way C works; for instance: (i) C may produce a random sample of $f_k(A_P)$, (ii) C may be given the value x as input and return $f_k(x)$ provided that $x \in A_P$, (iii) C may be given the lexicographic rank of an element x within $A_P$ and return $f_k(x)$.

Figure 2:
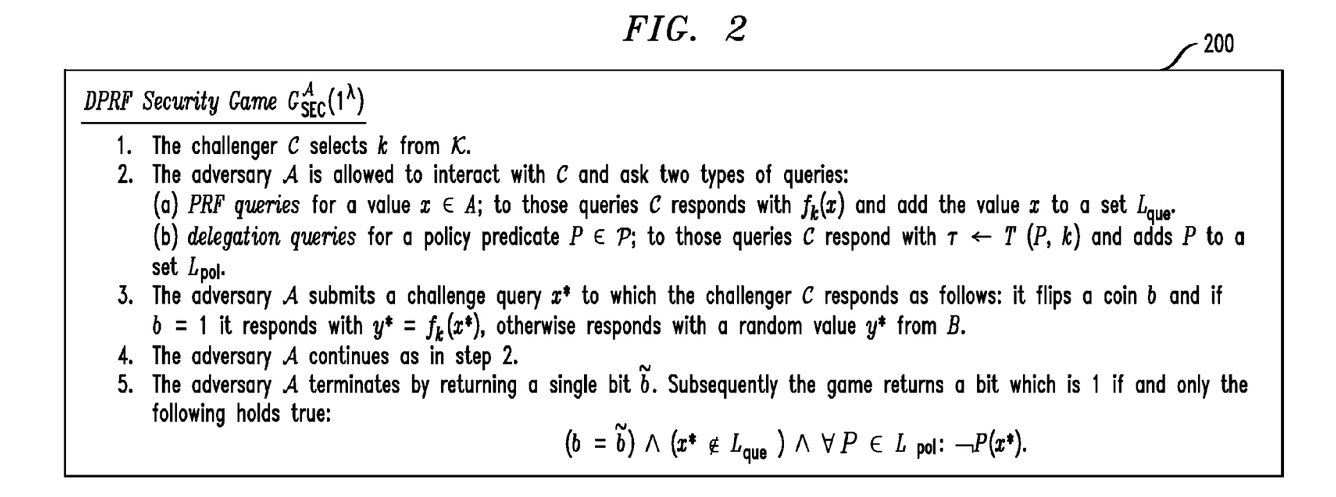
FIGS. 2 and 3 illustrate security games between attacker A and a challenger C indexed by parameter $\lambda$.

Security—For security, consider the case where the server is malicious and model DPRF security as a game $G_{SEC}A$ 200, shown in FIG. 2, between an attacker A and a challenger C indexed by parameter $\lambda$. Due to the delegation capabilities of DPRFs the security game 200 is more elaborate than the definition of a plain PRF, as shown in FIG. 2.

Definition 3 (Security) The DPRF scheme (F, T, C) is secure for a policy P if for any PPT A, it holds that $$Pr[G^A_{SEC}(1^\lambda) = 1] \leq \frac{1}{2} + \text{negl}(\lambda).$$

First, a delegatable PRF is a PRF. Specifically, any PRF attacker A against $f_k$ can be turned into an attacker A' that wins the DPRF game described above. Fix some PPT A and let $\alpha$ be its non-negligible distinguishing advantage. There will be some polynomial q so that, for any $\lambda$, $q(\lambda)$ is an upper bound on the number of queries submitted to A's oracle by A. Given such q and for fixed $\lambda$, hybrid oracle $(f_k/R)_j$ is defined for any $j \in \{0, \ldots, q(\lambda)\}$ that operates as follows: $(f_k/R)_j$ responds as $f_k(\bullet)$ in the first $q(\lambda)-j$ queries and as $R(\bullet)$ in the last j queries. Taking such sequence of oracles into account, by triangular inequality, it follows that there exists some value $j \in \{0, \ldots, q(\lambda)-1\}$ for which the distinguishing probability will be at least $\alpha/q(\lambda)$ for A to distinguish between two successive hybrid oracles $(f_k/R)_j$ and $(f_k/R)_{j+1}$ when R is a random function. This follows from the fact that A distinguishes the "extreme" hybrids $f_k(\bullet)$ and $R(\bullet)$ with probability $\alpha$. A' is constructed as follows out of A : A' plays the DPRF game and queries the DPRF function for the q(s)-j first queries of A. Then it submits the (j+1)-th query of A as the challenge. Finally it completes the simulation of A by answering any remaining queries of A with random values drawn from B. It is easy to see that the distinguishing advantage of A' is $\alpha/q(\lambda)$, i.e., non-negligible in $\lambda$.

Second, observe that there is a trivial construction of a delegatable PRF from any PRF: Consider an ordering ≤ over A, e.g. the lexicographical order. For fixed P,k set T(P,k)= $\langle f_k(x), \ldots, f_k(x_n) \rangle$, where $x_i$ is the i-th element of $A_P$ according to ≤. Given $\tau$, the set of states is $St_{P,k} = \{\tau, (2,\tau), \ldots, (n,\tau), \bot\}$ and the reconstruction function C can be simply defined to be a table-lookup. It is straightforward to show that (F, T, C) is a DPRF as long as the underlying family F is a PRF, since any delegation query can be interpreted as a series of polynomially many PRF queries.

The existence of a trivial DPRF construction with respect to arbitrary policies from any given PRF motivates the disclosed primitive: Interesting DPRF constructions will be those that are communication efficient, i.e., they allow trapdoors with size that is sublinear in the number of elements that satisfy the corresponding policy predicate.

(General) Policy Privacy

Figure 3:
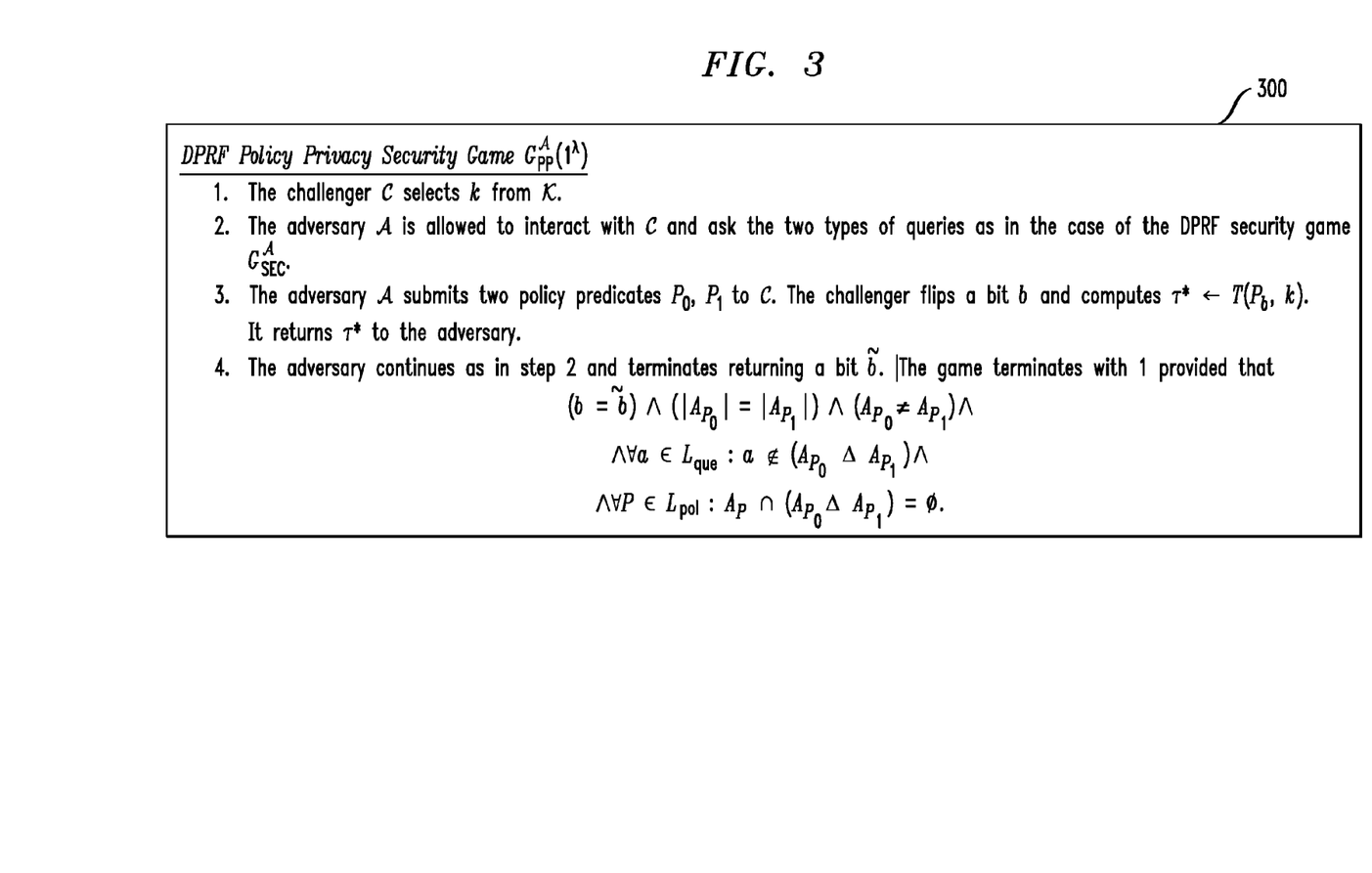

Consider an additional policy privacy property that goes beyond the standard (D)PRF security and is quite relevant in the context of a delegatable PRF. In order to model this privacy condition, an indistinguishability game $G_{PP}A$ 300 is used, carried out between an attacker A and a challenger C indexed by a security parameter Δ. The game 300 proceeds as shown in FIG. 3.

Definition 4 (Policy privacy)—The DPRF scheme (F, T,C) for a policy P satisfies policy privacy if for any PPT A, it holds that $$Pr[G_{SEC}^A(1^\lambda) = 1] \leq \frac{1}{2} + neg1(\lambda).$$

The above definition suggests that the trapdoor that corresponds to a certain policy predicate hides the predicate itself, at least among all policy predicates that enable the same number of elements and when the adversary does not know the PRF value of any element that satisfies one of them but not the other. Observe that all the restrictions stated are necessary: if $|A_{P_0}| \neq |A_{P_1}|$, then the adversary can distinguish $P_0$ from $P_1$ by counting the number of new PRF values it computes starting from state τ* and ending in ⊥. In addition, if the adversary learns any PRF value of an argument x within $A_{P_0}A_{P_1}$, either by making a PRF query or a delegation query, then it can guess b by computing $\{C_L(s)|s \in R(\tau)\}$ and running the equality test $C_L(s) \stackrel{?}{=} f_k(x)$ at each execution step.

It is submitted that even though desirable, the above property conflicts with efficiency (sublinear trapdoors) for a wide class of schemes. This will motivate relaxing the property as discussed below.

Assume that the policy predicates are ranges [a,b] that lie in an interval $[0, 2^\lambda-1]$. Then, no efficient and policy private DPRF scheme exists, if the trapdoor generation algorithm T(P,k) is deterministic and public and the delegated computation is tree-wise, i.e., for each range the trapdoor is a specific array of keys that enable in a deterministic way the calculation of the final set of values through a tree-like derivation. Indeed, for every 0<j≤b−a the delegated computation of the intersection [a+j,b] must be identical for [a,b] and [a+j,b+j]. Otherwise, an adversary can make PRF queries for all the values in [a+j,b] and, since it knows the way that each unique trapdoor of [a,b] and [a+j,b+j] computes the PRF values of the range [a+j,b], can thus distinguish the two range predicates by making the corresponding equality tests. By induction, this implies that for any j<a−b, in the trapdoor of [a,b] there exist keys $d_0, \ldots, d_j$ that allow the computation of $f_k(a), \ldots, f_k(a+j)$ respectively. Thus, the size of the trapdoor of the range [a,b] consists of r=b−a+1=#[a,b] keys which means that the DPRF cannot be efficient (i.e., delegate the range with a trapdoor size less than the set of values being delegated).

The above argument suggests that if policy privacy is to be attained, trapdoors are needed at least as long as the delegated values. However, the trivial construction for ranges, i.e., when the trapdoor of [a,b] is the ⟨ $f_k(a)$, $f_k(a+1), \ldots, f_k(b)$⟩ does not satisfy policy privacy. For instance, when delegating [1,3] and [3,5] the attacker can easily distinguish them by obtaining the value $f_k(3)$ (it belongs in the intersection hence the attacker is allowed to have it) and checking its location within the trapdoor vector. Nevertheless, arranging the PRF values of [a,b] as so that $f_k(x)$ is placed in position x mod(r) is a solution that works. Policy privacy follows from the fact that elements that belong in two overlapping ranges will be placed in the same fixed location in the two corresponding vector trapdoors, as shown below for exemplary ranges [0, 3], [1, 4], [2, 5], [3, 6], [4, 7] of size 4:

| | | | |
|---|---|---|---|
| $f_k(0)$ | $f_k(1)$ | $f_k(2)$ | $f_k(3)$ |
| $f_k(4)$ | $f_k(1)$ | $f_k(2)$ | $f_k(3)$ |
| $f_k(4)$ | $f_k(5)$ | $f_k(2)$ | $f_k(3)$ |
| $f_k(4)$ | $f_k(5)$ | $f_k(6)$ | $f_k(3)$ |
| $f_k(4)$ | $f_k(5)$ | $f_k(6)$ | $f_k(7)$ |

Efficient DPRFs are obtained out of tree-based PRFs where the values computed are at the leaves of a full binary tree, and the policy predicates are ranges covered by proper subtrees. In this case, even allowing a probabilistic trapdoor generator does not suffice to provide policy privacy for a very efficient scheme. To see this, let [a,b] be a range of size r and τ be a trapdoor for [a,b] of size $g(r)$—$O(\log^c r)$, i.e., g(r) is polylogarithmic in r, hence also in λ. By the Pigeonhole principle, there exists a delegation key y in τ that computes all the values corresponding to a set $T \subseteq [a,b]$ of size at least r/g(r), that is, a subtree T of depth at least d≥log(r)−log(g(r))=ω(1). Assuming without loss of generality that r/g(r) is an integer, the latter implies that there exists a value x∈[a,b] with a zero suffix of length d that is computed by this key y. Since, there are g(r) such possible values x∈[a,b], an adversary has significant probability 1/g(r) of guessing x. Then it can make a query x, receive $f_k(x)$ and submit as the challenge the two policies $P_0$=[a,b] and $P_1$=[x,b+(x−a)]. After it receives the challenge trapdoor τ*, it can locate all keys that correspond to subtrees of size ≥d and check if there is minimum leaf value (an all-zero path) in some of these subtrees that equals to $f_k(x)$. Then, the adversary can distinguish effectively $P_0,P_1$ since x cannot be covered by any subtree of size d in a trapdoor for [a+x,b+(x−a)]. This argument can be extended to more general tree-like delegation schemes.

Union Policy Privacy

Under the notion of union policy privacy, the adversary is restricted from making queries in the intersection of the challenge policy predicates (but is allowed to query at arbitrary locations outside the targeted policy set). This property is modeled by a game $G_{UPP}^A(1^\lambda)$ that proceeds identically as $G_{PP}A(1^\lambda)$ but terminates with 1 provided that all the following relaxed conditions are met: b=b̃, $|A_{P_0}|=|A_{P_1}|$, $A_{P_0} \neq A_{P_1}$, $\forall a \in L_{que}: a \notin (A_{P_0} \cup A_{P_1})$ and $\hat{\forall} P \in L_{pol}: A_P \cap (A_{P_0} \cup A_{P_1}) = \emptyset$. For policies consisting of disjoint predicates, games $G_{PP}A(1^\lambda)$ and $G_{UPP}A(1^\lambda)$ are equivalent.

Constructions

DPRF schemes are now presented for range policy predicates. In a section entitled "The BRC Construction," a first construction is described, called best range cover (BRC), which satisfies the correctness and security properties of DPRFs, achieving trapdoor size logarithmic in the range size. However, BRC lacks the policy privacy property. In a section entitled "The URC Construction," the BRC is built upon to obtain a policy-private DPRF scheme, called uniform range cover (URC), that retains the trapdoor size complexity of BRC.

It is noted that both of the following constructions operate also in the special case where the policy predicate specifies a singleton set of values over which the evaluation of a pseudorandom function is delegated, as would be apparent to a person of ordinary skill in the art. In some instantiations of these constructions for this use case, a trapdoor may degenerate to the pseudorandom function value computed over the actual singleton value specified by the corresponding singleton policy predicate. Therefore, in what follows, constructions for policy predicates specifying ranges of two or more values are described.

BRC Construction

Let $G: \{0,1\}^\lambda \to \{0,1\}^{2\lambda}$ be a pseudorandom generator and $G_0(k), G_1(k)$ be the first and second half of the string $G(k)$, where the specification of G is public and k is a secret random seed. The GGM pseudorandom function family is defined as $F = \{f_k: \{0,1\}^n \to \{0,1\}^\lambda\}_{k \in \{0,1\}^\lambda}$, such that $f_k(x_{n-1}, \ldots, x_0) = G_{x_0}(\ldots (G_{x_{n-1}}(k)))$, where n is polynomial in $\lambda$ and $x_{n-1} \ldots x_0$ is the input bitstring of size n.

Figure 4:
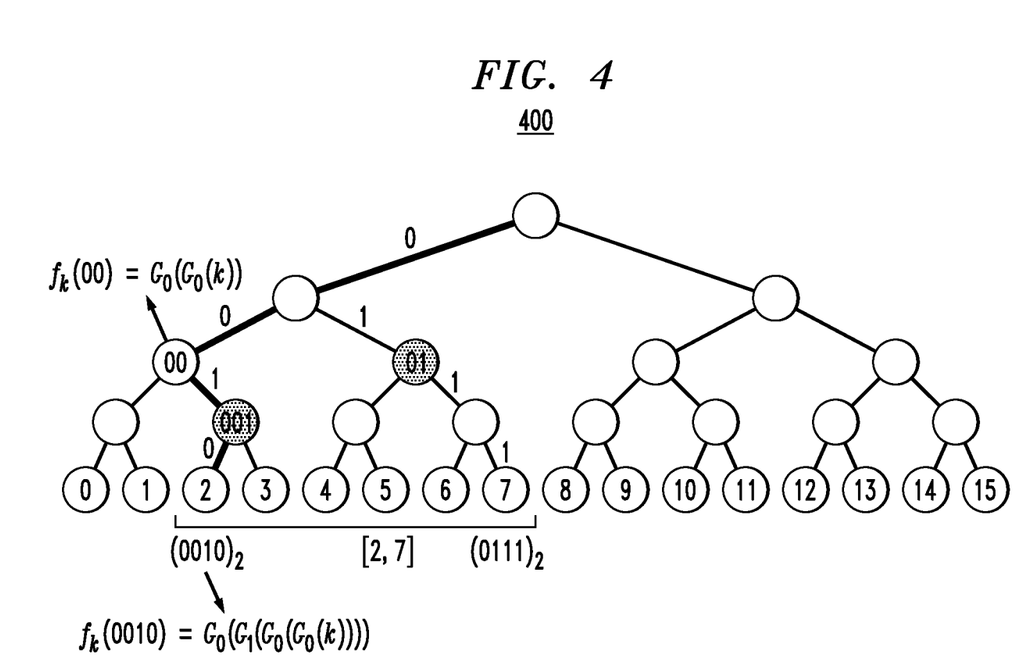
FIG. 4 illustrates a Gordreich, Goldwasser, Micali (GGM) binary tree on the PRF domain along with trapdoor information $\tau$ computed by aspects of the presented invention.

FIG. 4 illustrates a GGM binary tree 400 on the PRF domain with 4 levels, along with trapdoor information τ computed by aspects of the presented invention. The leaves in FIG. 4 are labeled with a decimal number from 0 to 15, sorted in ascending order. Every edge is labeled with 0 (1) if it connects a left (resp. right) child. Every internal node is labeled with the binary string determined by the labels of the edges along the path from the root to this node. Suppose that the PRF domain is $(0,1)^4$. Then, the PRF value of 0010 is $f_k(0010) = G_0(G_1(G_0(G_0(k))))$. Observe that the composition of G is performed according to the edge labels in the path from the root to leaf $2=(0010)_2$, selecting the first (second) half of the output of G when the label of the visited edge is 0 (resp. 1). Based on the above, the binary representation of the leaf labels constitute the PRF domain, and every leaf is associated with the PRF value of its label.

Every internal node of the GGM tree can be associated with a partial PRF value, by performing the composition of G as determined by the path from the root to that node. For example, node 00 in FIG. 4 is associated with partial PRF $G_0(G_0(k))$. Henceforth, for simplicity, $f_k(x_{n-1} \ldots x_j)$ denotes the partial PRF $G_{x_j}(\ldots (G_{x_{n-1}}(k)))$. Observe that if a party has the partial PRF $f_k(x_{n-1} \ldots x_j)$, then it can compute the PRF values of all $2^j$ inputs that have prefix $x_{n-1} \ldots x_j$, simply by following a DFS traversal in the subtree with root $x_{n-1} \ldots x_j$ and composing with seed $f_k(x_{n-1} \ldots x_j)$. In one example, using the partial PRF value at node 00, the PRF values of the inputs in (decimal) range [0,3] can be derived as $f_k(0000) = G_0(G_0(f_k(00)))$, $f_k(0001) = G_1(G_0(f_k(00)))$, $f_k(0010) = G_0(G_1(f_k(00)))$, and $f_k(0011) = G_1(G_1(f_k(00)))$.

For any range [a,b] of leaf labels, there is a (non-unique) set of subtrees in the GGM tree that cover exactly the corresponding leaves. For instance, [2,7] is covered by the subtrees rooted at nodes 001 and 01 (colored in grey). As indicated above, a party having the partial PRF values of these subtree roots and the subtree depths, it can derive all the PRF values of the leaves with labels in [a,b]. In the current example, having $(f_k(001),1)$ and $(f_k(01),2)$, it can derive the PRF values of the leaves with labels in [2,7]. The first construction is based on the above observations. In particular, given a range policy predicate $[a,b] \in P$ with size $|A_P| = b-a+1$, it finds the minimum number of subtrees that cover [a,b], which is similar to finding the canonical subsets for 1-dimensional range queries. As such, this scheme is referred to as best range cover (BRC).

The BRC DPRF construction is a triplet (F,T,C), where F is the GGM PRF family described above with tree depth n. The delegation policy is $P = \{([a,b] | 0 \leq a < b \leq a + \lambda^\gamma \leq 2^n - 1\}$, where γ is a constant integer.

Figure 5:
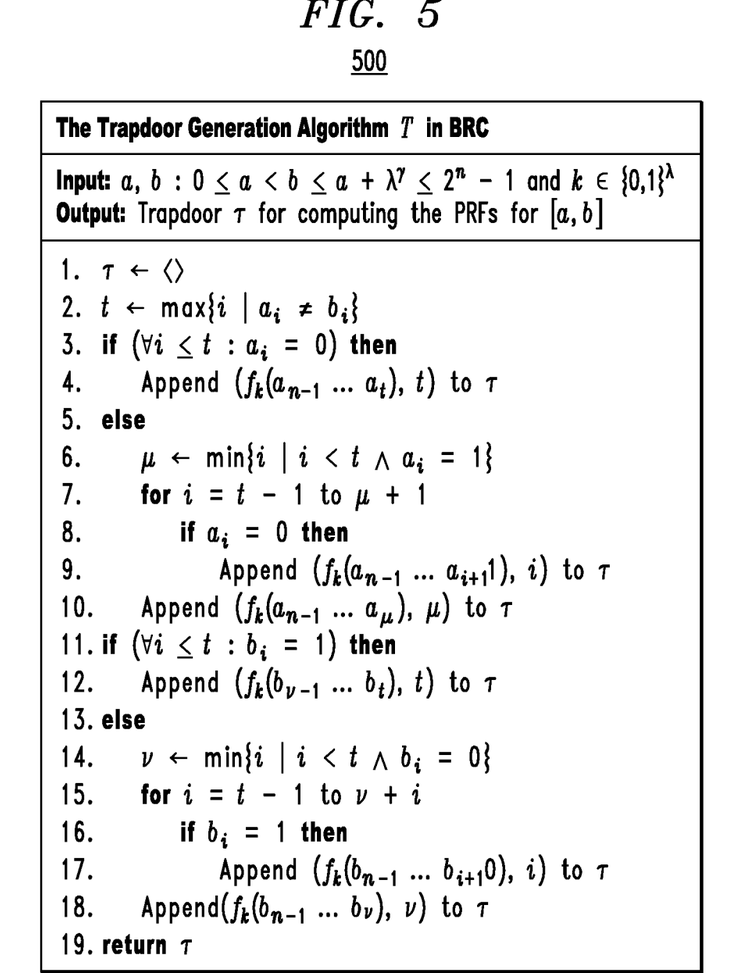
FIGS. 5 and 6 illustrate exemplary pseudo code for the trapdoor generation algorithm T for best range cover and uniform range cover implementations, respectively.

FIG. 5 illustrates exemplary pseudo code 500 for the trapdoor generation algorithm T of BRC. This algorithm takes as input secret key k and a range predicate $[a,b] \in P$. It outputs a delegation trapdoor τ that enables the computation of $f_k(x)$ for every x whose decimal representation is in [a,b] (i.e., the PRF values of the leaves in the GGM tree with labels in [a,b]). T initially finds the first bit in which a and b differ (Line 2), which determines the common path from the root to leaves a and b. Suppose that this common path ends at node u. T then traverses the left and right subtree of u separately (Lines 3-10 and 1-18, respectively). The left traversal is described and the right one is performed symmetrically. T continues the path from the left child of u, denoted by v, to a. It checks whether a is the leftmost leaf of v's subtree. In this case the PRF value of v is included in τ along with the depth of v's subtree, and the traversal terminates (Lines 3-4). Otherwise, it includes the PRF value of the right child of v and the depth of the subtree rooted at that child, and continues the traversal in the left child of v iteratively (Lines 5-10).

In the example of FIG. 4, for input [2,7], T outputs trapdoor $\tau = \langle (f_k(001),1), (f_k(01),2) \rangle$. By its description, it can be seen that the algorithm of FIG. 5 covers the input range with maximal subtrees. However, there is one exception; if the input range is exactly covered by a single subtree (e.g., [4,7]), then T covers it with two subtrees (rooted at 010 and 011, respectively). In general, T in BRC covers the input range with at least two subtrees.

The PRF computation algorithm C of BRC is now described. For fixed P=[a,b] of size r and key k, the set of states are defined as $St_{P,k} = \{(\tau, (1,\tau), \ldots, (r-1,\tau), \bot\}$, where $\tau = \langle (y_1, d_1), \ldots, (y_m, d_m) \rangle$ is the trapdoor produced by algorithm T. Note that, every y value corresponds to a partial PRF value associated with the root of a GGM subtree. Therefore, there is a natural ordering of PRF values for a given τ, starting from the leftmost leaf of the subtree of $y_1$ to the rightmost leaf of the subtree of $y_m$. Note that this order is not necessarily the same as the order of the leaves in the GGM tree. Starting from the PRF value of the leftmost leaf of the $y_1$ subtree, C computes in every next step the PRF value of the next leaf in the ordering discussed above. Specifically, C starts with state τ and computes $C(\tau) = \langle G_0(\ldots (G_0(y_1))), (1,\tau) \rangle$, where the composition is performed $d_1$ times. Next, given state (i,τ), C locates the unique subtree that covers the (i+1)-th leaf x in the ordering of τ. Specifically, it finds the pair $(y_t, d_t)$ in τ, where t is such that $\Sigma_{\rho=1}^{t-1} 2^{d_\rho} \leq i < \Sigma_{\rho=1}^{t} 2^{d_\rho}$. Then, the suffix $x_{d_t} \ldots x_0$ is the binary representation of $i - \Sigma_{\rho=1}^{t-1} 2^{d_\rho} \in [0, 2^{d_t} - 1]$. Given this suffix, C can compute $$f_k(x) = G_{x_0}(\ldots (G_{x_{d_t}}(y_i)))$$

and output $$C((i, \tau)) = \langle G_{x_0}(\ldots (G_{x_{d_t}}(y_i))), (i+1, \tau) \rangle.$$

Note that, for input state $(r-1,\tau)$, C outputs $C((r-1,\tau))=\langle G_1(\ldots G_1(y_m))),\perp\rangle$, where the composition is performed $d_m$ times.

In the example of FIG. 4, the trapdoor for range [2,14] is $\langle (f_k(01),2),(f_k(001),1),(f_k(10),2),(f_k(110),2),(f_k(1110),0)\rangle$. Algorithm C computes the PRF values for leaves 4, 5, 6, 7, 2, 3, 8, 9, 10, 11, 12, 13, 14 in this order, i.e., $$C(\tau)=\langle G_0(G_0(f_k(01))),(1,\tau)\rangle =$$
$$\langle f_k(0100),(1,\tau)\rangle \rightarrow$$

$$C((1,\tau))=\langle G_1(G_0(f_k(01))),(2,\tau)\rangle =$$
$$\langle f_k(0101),(2,\tau)\rangle \rightarrow$$

$$\vdots$$

$$C((12,\tau))=\langle f_k(1110),\perp\rangle.$$

Based on the above description, some partial PRF values are computed multiple times in C, e.g., $f_k(011)$ is computed twice; once during calculating $f_k(0110)$ and once for $f_k(0111)$. Note that this can be easily avoided by employing an external data structure of size $O(r)$; every PRF value is computed once, stored in the data structure, and retrieved in a next step if necessary. In this manner, the computational cost of C can become $O(r)$, since one PRF value is computed for every node in the subtrees covering the range (of size r).

The correctness of BRC is stated in the following theorem.

Theorem 1 The BRC DPRF construction $(F,T,C)$ with respect to delegation policy $P=\{[a,b]0\le a<b\le a+\lambda^\gamma\le 2^n-1\}$, where n is the depth of the underlying GGM tree, $\gamma$ is a constant integer, and $\lambda^\gamma$ is the maximum range size, is correct.

The trapdoor size complexity in BRC is now discussed. Let $V_1$, $V_2$ be the sets of arguments of the PRF values computed by Lines 3-10 and 11-18 of algorithm T, respectively. Then, $|V_1|+|V_2|=r\cdot|V_1|$ is analyzed and the analysis for $V_2$ is similar. Observe that, in every step in Lines 3-10, the algorithm covers more than $\lfloor|V_1|/2\rfloor$ values of $V_1$ with a maximal subtree of the sub-range defined by $V_1$. Iteratively, this means that the algorithm needs no more than $\log(r)$ maximal subtrees to cover the entire sub-range of $V_1$. Consequently, the total number of elements in $\tau$ is $O(\log(r))$.

BRC does not satisfy policy privacy, even for non-intersecting policy predicates, as shown in FIG. 4. Consider ranges [2,7] and [9,14], both with size 6. The trapdoors generated for these ranges are $\langle ((f_k(001),1), (f_k(01),2)\rangle$ and $\langle (f_k(101),1),(f_k(1001),0),(f_k(110),1), (f_k(1110),0)\rangle$, respectively. Clearly, these trapdoors are distinguishable due to their different sizes. This motivates the second DPRF construction presented in the next section.

URC Construction

Consider again the ranges [2,7] and [9,14], for which BRC generates two distinguishable trapdoors, $\langle ((f_k(001), 1), (f_k(01),2)\rangle$ and $\langle (f_k(101),1),(f_k(1001),0), (f_k(110),1), (f_k(1110),0)\rangle$, respectively. Instead of computing the trapdoor of [2,7] as above, assume that an alternative trapdoor is generated equal to $$\langle (f_k(010),1),(f_k(0010),0),(f_k(011),1),(f_k(0011),0)\rangle$$

Observe that this trapdoor appears to be indistinguishable to that of [9,14]; the two trapdoors have the same number of elements, the first parts of their elements are all partial PRFs, whereas their second pans (i.e., the depths) are pairwise equal. This suggests that, policy privacy could be achieved, if a trapdoor algorithm T is devised such that, for any range predicate of a fixed size r, it always generates a trapdoor with a fixed number of elements and a fixed sequence of depths. More simply stated, the algorithm should produce uniform trapdoors for ranges of the same size. The challenge is to design such an algorithm retaining the logarithmic trapdoor size of BRC. Next, the second DPRF construction is presented, called uniform range cover (URC), which enjoys the efficiency of BRC and the union policy privacy property.

URC builds upon BRC. In particular, URC starts by producing a trapdoor as in BRC, and then modifies it to generate a uniform trapdoor for the given range r. Recall that a trapdoor in BRC is a sequence of elements, where the first part is a (full or partial) PRF value, and the second is a depth value. Moreover, the depths have some useful structure, referred to as decomposition, formalized as follows:

Definition 5 Let r be an integer greater than 1. A pair of non-negative integral sequences $D=((k_1,\ldots,k_c),(l_1,\ldots,l_d))$ is called a decomposition of r if the following hold:
1. $\sum_{i=1}^{c} 2^{k_i}+\sum_{j=1}^{d} 2^{l_j}=r$
2. $k_1>\ldots>k_c$ and $l_1>\ldots>l_d$ A decomposition of r $D=((k_1,\ldots,k_c),(l_1,\ldots,l_d))$ is a worst-case decomposition (w.c.d.) of r if it is of maximum size, i.e., for every decomposition of r $D'=((k_1',\ldots,k_{c'}'), (l_1',\ldots,l_{d'}'))$, $c'+d'\le c+d$. $M_D\triangleq \max\{k_1,l_1\}$ is defined as the maximum integer that appears in D.

By the description of algorithm T in BRC, for fixed range size r, the depths in the trapdoor can be separated into two sequences that form a decomposition of r. Each sequence corresponds to a set of full binary subtrees of decreasing size that cover leaves in the range predicate. The usage of the worst case decomposition will become clear soon.

The following lemma shows that the maximum integer that appears in any decomposition of r and, hence, the maximum depth of a subtree in a cover of a range of size r, can have just one of two consecutive values that depend only on r.

Lemma 1 Let $D=((k_1,\ldots,k_c),(l_1,\ldots,l_d))$ be a decomposition of r. Define $B(r)\triangleq \lceil \log(r+2)\rceil -2$. Then $M_D\in\{B(r),B(r)+1\}$. In addition, if $M_D=B(r)+1$ then the second largest value is less than $M_D$.

By Lemma 1, the trapdoor that is generated by BRC for a range $P=[a,b]$ of size $|A_P|=r$, even if this trapdoor corresponds to a w.c.d. of r, consists of at most $|\{0,\ldots, B(r)\}|+|\{0,\ldots, B(r)+1\}|=2B(r)+3$ pairs. Hence, the trapdoor size is $O(\log(r))$, which complies with the bound described in the BRC Section. Moreover, since $|A_P|\le \lambda^\gamma$, every trapdoor has no more than $2\lceil \log(\lambda^\gamma+2)\rceil -1$ pairs.

Observe that two trapdoors that correspond to the same w.c.d. (i.e., the two sequences in the decomposition are identical pairwise) appear indistinguishable. Moreover, it can be shown that a trapdoor following a w.c.d. retains the logarithmic size in r. Therefore, the trapdoor algorithm T in URC employs a converter that takes as input a BRC trapdoor, and produces an alternative trapdoor that complies with a fixed w.c.d.

Theorem 2 Let $D=((k_1,\ldots,k_c),(l_1,\ldots,l_d))$ be a decomposition of r. Then all the elements in $\{0,\ldots, M_D\}$ appear in D iff D is a w.c.d. of r.

A consequence of Theorem 2 and Lemma 1 is that, for every integer $r>1$, a w.c.d. of r is a proper rearrangement of the integers that appear in the w.c.d. r where the first sequence is $(B(r),\ldots,0)$ and the second sequence is the remaining integers in the decomposition in decreasing order. This unique w.c.d. is referred to as a uniform decomposition of r. The main idea in URC is to always generate a trapdoor that complies with the uniform decomposition of r.

Figure 6:
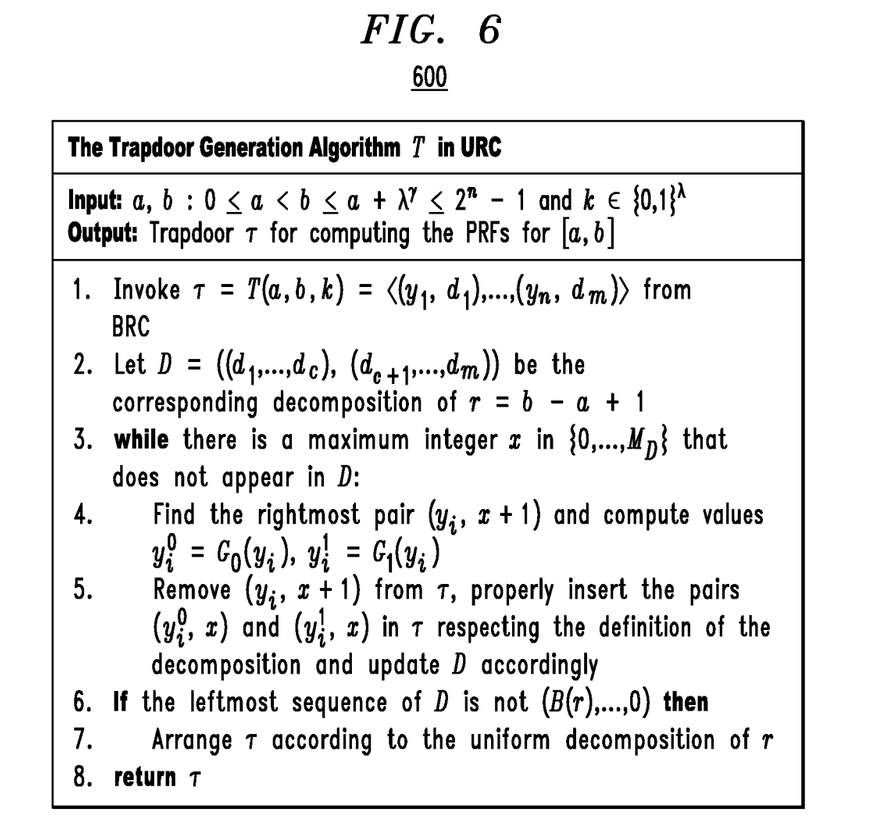

FIG. 6 illustrates exemplary pseudo code 600 for the algorithm T in URC. The process starts with invoking the T algorithm of BRC to get an initial trapdoor τ (Line 1). Let D be the decomposition implied by τ (Line 2). The loop in Lines 3-5 utilizes Theorem 2 and works as follows. It finds the highest depth x that does not exist in D, and "splits" the partial PRF value y, in the rightmost pair in τ with depth x+1, producing two new partial PRF values with depth x, i.e., $y_i^0 = G_0(y_i)$ and $y_i^1 = G_1(y_i)$ (Line 4). Note that these values correspond to the two children of the subtree of $y_i$. Thus, if element $(y_i, x+1)$ is substituted by $(y_i^0, x), (y_i^1, x)$ in τ, then the trapdoor can still produce the same leaf PRF values as before. However, at all times the sequence of depths in τ should form a decomposition. Hence, after removing $(y_i, x+1)$, $(y_i^0, x)$ is inserted in the left pair sequence and $(y_i^1, x)$ in the right pair sequence of τ (Line 5). Upon termination of the loop, all the values in $\{0, \ldots, M_D\}$ appear in D and, thus, a w.c.d. is reached according to Theorem 2. The process concludes, after properly re-arranging the elements of τ, such that they comply with the unique uniform decomposition of τ (Line 7). This is done deterministically, by filling the missing depths from $\{0, \ldots, B(r)\}$ in the left sequence with the unique appropriate pair that exists (by Theorem 2) in the right sequence.

In the running example, for the range [2,7], the T algorithm in URC converts the original token retrieved by the trapdoor algorithm of BRC, $\tau = \langle (f_k(001), 1), (f_k(01), 2) \rangle$, as follows (a newly inserted element to the left sequence is underlined, and a newly inserted element to the right sequence is depicted as bold):

$((f_k(001), 1), (f_k(01), 2))$

↓

$((\underline{f_k(0010), 0}), (f_k(01), 2), (\mathbf{f_k(0011), 0}))$

↓

$((\underline{f_k(010), 1}), (f_k(0010), 0), (\mathbf{f_k(011), 1}), (f_k(0011), 0))$ The C algorithm of URC is identical to BRC, because the trapdoor in URC has exactly the format expected by this algorithm, i.e., pairs of PRF values corresponding to GGM subtrees along with their depths. Moreover, during the evolution of the initial BRC trapdoor into one of uniform decomposition in the T algorithm of URC, a partial PRF value y is substituted by two new PRF values that can generate the same leaf PRF values as y. As such, the correctness of the BRC scheme is inherited in URC. Finally, due to Lemma 1, the size of a w.c.d. (and, hence, also a uniform decomposition) of r is O(log(r)), which means that the trapdoor size in URC is also O(log(r)).

Security

The security of the BRC and URC constructions are now addressed. The following discussion relies on the security of the pseudorandom generator of the underlying GGM construction. However, DPRFs entail a more involved security game than GGM and, hence, the constructions require a more complex discussion. The reason is that, contrary to the case of GGM where the adversary obtains only leaf PRFs, the adversary in a DPRF can obtain also partial PRF values in the GGM tree through the trapdoors.

Note that the formation of a trapdoor (which is independent of k) for a range predicate P of size r is deterministic and public in both BRC and URC. Thus, when querying the oracle in the security game, the adversary can map the partial or full PRF values appearing in τ for a selected P to subtrees in the GGM tree. This implies that it can reduce its delegation queries to prefixes for strings in $(0,1)^n$, where n is the depth of the GGM tree. Hence, any queried prefix of the adversary is denoted as $x_{n-1} \ldots x_t$, where the maximum value of t depends on the maximum possible range size $\lambda^\gamma$. Since the size of every exemplary trapdoor is O(log(λ)), a PPT adversary makes polynomially many such queries. The formation of a trapdoor does not play any role in the security of a DPRF scheme, since the challenge will always be a single PRF value. Therefore, there will be no separation in discussing the security of the BRC and the URC constructions.

The security property of the DPRF schemes are addressed by ensuring and leveraging the security of two special cases. First, consider the case that the adversary is non-adaptive, i.e., it poses all its queries in advance.

Lemma 2 The BRC and URC DPRF schemes with depth n and maximum range size $\lambda^\gamma$, are secure against PPT adversaries that make all their queries, even the challenge query, non-adaptively.

The above lemma is used to address the security of a special category of DPRF schemes, where the maximum range size is at least half of $[0, 2^n - 1]$, which represents the biggest interval where range predicates are defined.

Lemma 3 The BRC and URC DPRF schemes with depth n and maximum range size $\lambda^\gamma$ are secure if $2^{n-1} \leq \lambda^\gamma < 2^n$.

Theorem 3 The BRC and URC DPRF schemes with depth n and maximum range size $\lambda^\gamma$ are secure.

Policy Privacy

This section analyzes the policy privacy of URC. As indicated above, URC cannot satisfy the general policy privacy property, because it is efficient. In a toy example, for challenge ranges [2,5] and [4,7], the trapdoors will contain PRF values corresponding to subtrees covering the ranges as [2,3], {4}, {5} and [4,5], {6}, {7}, respectively. Therefore, the adversary can issue query for leaf 4 and receive a PRF value y. Having $\langle (y_1, 1), (y_2, 0), (y_3, 0) \rangle$ as challenge trapdoor, it can check whether $y_2 = y$, which happens only when [2,5] was chosen by the challenger.

Nevertheless, it can be shown that URC achieves union policy privacy. In the union policy privacy game, the adversary cannot obtain a PRF value for a leaf in the intersection of the challenge ranges, i.e., for 4 and 5. This prevents the adversary from launching the attack described above.

Theorem 4 The URC scheme with depth n and maximum range size $\lambda^\gamma$ is a DPRF scheme with union policy privacy.

Extensions

Multi-Instance DPRFs

Consider a multi-instance version of delegatable PRFs. In the multi-instance version, there is a sequence of independent PRF instances from a PRF family $\{f_k: A \to B | k \in K\}$ that should simultaneously delegate following a certain policy. The corresponding correctness condition for a multi-instance PDRF is described.

A triple (F, T, C) is a multi-instance DPRF (MI-DPRF) with respect to policy P if it satisfies a corresponding notion of correctness defined as follows. Let n be an integer polynomial in λ. T is a PPT algorithm such that given a description of $\bar{P} = (P_1, \ldots, P_n) \in P^*$ and a sequence of keys $\bar{K} = (k_1, \ldots, k_n) \in K^*$, outputs a trapdoor $(dk_1, \ldots, dk_n, \tau)$. For every i, the reconstruction algorithm C and the correctness conditions follow the lines of the respective definition of DPRFs, instantiated for pair $P_i, k_i$. The only difference is that now the delegation of evaluations of an instance of the PRF family is facilitated by an additional individual delegation key $dk_i$, which becomes part of the state.

Formally, C can be considered as a function $$C: St_{P_i,k_i} \to B \times St_{P_i,k_i},$$

where $St_{P_i,k_i}$ is a set of states and the output $C(s) = \langle C_L(s), C_R(s) \rangle$ is a pair consisted of a PRF value and a state in $St_{P_i,k_i}$. The set of reachable states R(S) from subset $S \subseteq St_{P_i,k_i}$ is defined as previously.

Definition 6 (Correctness, MI-DPRF) The DPRF scheme (F, T, C) is correct for a policy F if for every $\overline{P}, \overline{K}$ and for every $i \in [n]$:
1. $\{(dk_i, \tau) | (dk_1, \ldots, dk_n, \tau) \leftarrow T(\overline{P}, \overline{K})\} \cap \{\bot\} \subseteq St_{P_i,k_i}$.
2. $C_R(\bot) = \bot$.
3. There exists a polynomial $p_i$ s.t. $|A_{P_i}| \le p_i(\lambda)$.
4. There exists a polynomial $q_i$ s.t. for every $(dk_1, \ldots, dk_n, \tau) \leftarrow (\overline{P}, \overline{K})$:
   (a) $\bot \in R((dk_i, \tau))$.
   (b) $|R((dk_i, \tau))| \le q_i(|A_{P_i}|)$.
   (c) $\{f_{k_i}(x) | P_i(x)\} = f_{k_i}(A_{P_i}) = \{C_L(s) | s \in R((dk_i, \tau))\}$.

The security definition of MI-DPRFs follows directly from the corresponding definition of DPRF security, by extending the latter in the obvious way. In the security game, the adversary has adaptive access to many instances of DPRFs while receiving a challenge from a particular instance of its choice. The restrictions on the challenge phase are straightforward.

Generic Classes of DPRFs

Consider two generic classes of DPRFs which by construction define corresponding general design frameworks for implementing DPRFs.

Tree-like DPRFs—In a tree-like DPRF, the trapdoor generation algorithm T(P,k) is deterministic and public and the delegated computation is tree-wise, i.e., for each range the trapdoor is a specific array of keys that enable in a deterministic way the calculation of the final set of values through a tree-like derivation.

Algebraic singleton-range multiple-instance (MI)-DPRFs—In an algebraic singleton-range MI-DPRF the policy predicates are singleton sets. Here, elliptic curve groups for which a bilinear map can be defined are employed. These MI-DPRFs have the following general form. Their domain is arbitrary, in which case assume the existence of a hash function $H: \{0,1\}^\circ \to G_1$ and encode the input as an element of $G_1$. Then the MI-DPRF's are based on a polynomial Q defined over a set of variables X. Assuming that $n = |X|$ the secret-key of the MI-DPRF will be a random vector over n-size vector k in integers modulo p. The pseudorandom function determined by the DPRF are generally defined as follows:

$$F_k(a) = e(H(a), g)^{Q(k)}.$$

Given the above, it is worth observing that in the multiple-instance DPRF setting it is even non-trivial to delegate for policies where P simply contains sequences of singletons over A, i.e., sequences of the form $P_1 \times \ldots \times P_n$ where each $P_i$ is true only for a fixed $a \in A$ independently of i. In contrast, note that the same type of policies are entirely trivially delegatable in the single instance setting for any PRF.

Applications

Authentication and Access Control in RFID

Radio Frequency Identification (RFID) is a popular technology that is expected to become ubiquitous in the near future. An RFID tag is a small chip with an antenna. It typically stores a unique ID along with other data, which can be transmitted to a reading device lying within a certain range from the tag. Suppose that a trusted center (TC) possesses a set of RFID tags (attached to books, clothes, etc), and distributes RFID readers to specified locations (e.g., libraries, campuses, restaurants, etc.). Whenever a person or object carrying a tag lies in proximity with a reader, it transmits its data (e.g., the title of a book, the brand of a jacket, etc.). The TC can then retrieve these data from the RFID readers, and mine useful information (e.g., hotlist books, clothes, etc.).

Despite its merits, RFID technology is challenged by security and privacy issues. For example, due to the availability and low cost of the RFID tags, one can easily create tags with arbitrary information. As such, an adversary may impersonate other tags, and provide falsified data to legitimate readers. On the other hand, a reader can receive data from any tag in its vicinity. Therefore, sensitive information may be leaked to a reader controlled by an adversary. For example, the adversary may learn the ID and the title of a book stored in a tag, match it with public library records, and discover the identity and reading habits of an individual.

Motivated by the above, the literature has addressed authentication and access control in RFID. A notable paradigm was introduced in D. Molnar et al., "A Scalable, Delegatable Pseudonym Protocol Enabling Ownership Transfer of RFID Tags," SAC, 276-290 (2006), which can be directly benefited by DPRFs. At a high level, every tag is associated with a key, and the trusted center (TC) delegates to a reader a set of these keys (i.e., the reader is authorized to authenticate and access data from only a subset of the tags). The goal is for the TC to reduce certain costs, e.g., the size of the delegation information required to derive the tag keys.

Observe that a DPRF (F, T, C) is directly applicable to the above setting. F is defined on the domain of the tag IDs, and its range is the tag keys. Given a delegation predicate on the tag IDs, the TC generates a trapdoor via algorithm T, and sends it to the reader. The latter runs C on the trapdoor to retrieve the tag keys. In fact, for the special case where the access policy is a range of IDs, the delegation protocol suggested in D. Molnar et al. is identical to the non-private BRC scheme (D. Molnar et al. lacks rigorous definitions and proofs). Range policies are meaningful, since tag IDs may be sequenced according to some common theme (e.g., books on the same topic are assigned consecutive tag IDs). In this case, a range policy concisely describes a set of tags (e.g., books about a certain religion) and, hence, the system can enjoy the logarithmic delegation size of BRC. However, as explained above, BRC leaks the position of the IDs in the tree, which may further leak information about the tags. Although D. Molnar et al. addresses tag privacy, it provides no privacy formulation, and overlooks the above structural leakage. This can be mitigated by directly applying the disclosed policy-private URC construction for delegating tag keys to the readers. To sum up, DPRFs find excellent application in authentication and access control in RFID, enabling communication-efficient tag key delegation from the TC to the reader. Moreover, policy-private DPRFs provide a higher level of protection for the tag IDs against the readers.

Batch Queries in Symmetric Searchable Encryption

Symmetric searchable encryption (SSE) enables queries to be processed directly on ciphertexts generated with symmetric encryption. Although SSE is a general paradigm, consider the definitions and schemes of R. Curtmola et al., "Searchable Symmetric Encryption: Improved Definitions and Efficient Constructions," CCS (2006). These works support the special case of keyword queries, and provide an acceptable level of provable security. The general framework underlying R. Curtmola et al. is as follows. In an offline stage, a client encrypts his data with his secret key k, and uploads the ciphertexts c to an untrusted server. He also creates and sends a secure index I on the data for efficient keyword search, which is essentially an encrypted lookup table or inverted index. Given a keyword w, the client generates a query token $\tau_w$ using k, and forwards it to the server. It is important to stress that this trapdoor is merely comprised of one or more PRF values computed on w with k, which were used as keys to encrypt I. For simplicity and without loss of generality, assume that $\tau_w$ is a single PRF value. The server uses $\tau_w$ on I and retrieves the IDs of the ciphertexts associated with w. The results $c_1, \ldots, c_m$ are retrieved and transmitted back to the client, who eventually decrypts them with his key. The security goal is to protect both the data and the keyword from the server.

Figure 7A:
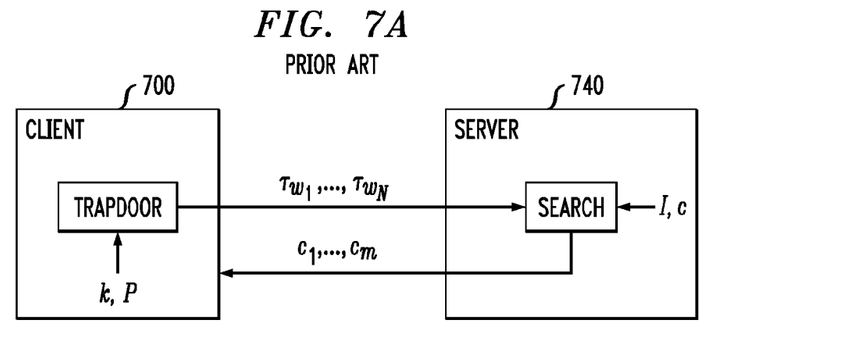
FIG. 7A illustrates a conventional Symmetric searchable encryption scheme between a client and a server.

Suppose that the client wishes to search for a batch of N keywords $w_1, \ldots, w_N$. For instance, the client may ask for documents that contain multiple keywords of his choice (instead of just a single one). As another example, assume that the client's data are employee records, and each record contains a salary attribute that takes as values intervals of the form [i K, (i+1)K] (i.e., instead of exact salaries). These intervals can serve as keywords in SSE search. Suppose that the client wishes to retrieve records with salaries in a range of intervals, e.g., [1K, 10K]. Observe that this cannot be processed with a single keyword query (no record is associated with [1K, 10K]). To overcome this while utilizing the SSE functionality, the client can ask 9 distinct queries with keywords "[1K, 2K]," "[2K, 3K]," . . . , "[9K, 10K]," which cover the query range [1K, 10K]. Such scenarios are handled with "traditional" SSE as shown in FIG. 7A. FIG. 7A illustrates a conventional Symmetric searchable encryption scheme between a client 700 and a server 740. Given a predicate P that describes the keywords $w_1, \ldots, w_N$ in the batch query, the client 700 generates N trapdoors $\tau_{w_1}, \ldots, \tau_{w_N}$ using the standard SSE trapdoor algorithm, and sends them to the server 740. The server 740 then searches I with every $\tau_{w_i}$ following the SSE protocol. Apparently, for large N, the computational and communication cost at the client is greatly impacted.

Figure 7B:
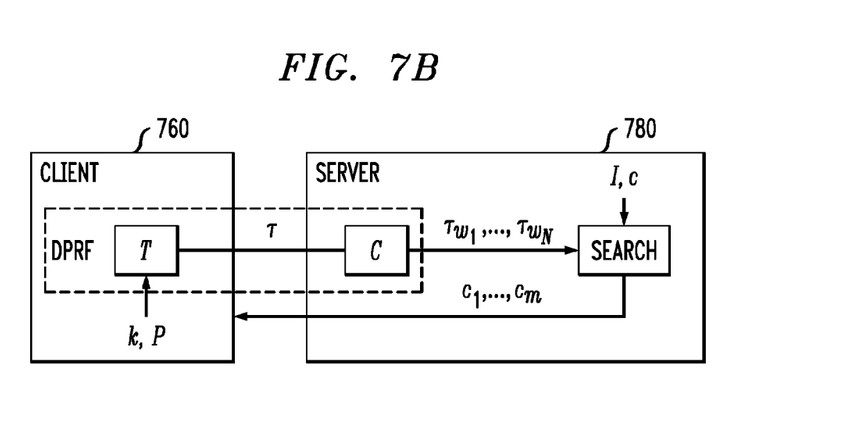
FIG. 7B illustrates a Symmetric searchable encryption scheme between a client and a server augmented with DPRFs in accordance with aspects of the present invention.

FIG. 7B illustrates a Symmetric searchable encryption scheme between a client 760 and a server 780 augmented with DPRFs in accordance with aspects of the present invention. The SSE framework of FIG. 7A can be augmented with DPRF functionality, in order to support batch queries with sublinear (in N) processing and communication cost at the client, while providing provable security along the lines of [22]. Recall that $\tau_{w_i}$ is practically a PRF on $w_i$ produced with key k. Therefore, instead of computing a PRF value for every $w_i$ himself, the client delegates the computation of these PRF values to the server by employing a DPRF (F ,T,C), where F is defined over the domain of the keywords. Given predicate P and k, the client runs T and generates trapdoor $\tau$, which is sent to the server. The latter executes C on $\tau$ to produce $\tau_{w_1}, \ldots, \tau_{w_N}$. Execution then proceeds in the same manner as in "traditional" SSE. Observe that, for the special case of ranges, if URC is used as the DPRF, the computational and communication cost at the client decreases from O(N) to O(log(N)).

The above framework can be proven secure against adaptive adversaries. The most important alteration in the security game and proof is the formulation of the information leakage of the C algorithm of the DPRF. Although a policy-private DPRF provides predicate indistinguishability, there may still be some information leaked from C about the computed PRFs, which may be critical in SSE. Specifically, C may disclose some relationships between two PRF values satisfying the predicate P. For instance, in the disclosed URC scheme, C may disclose that two PRF values correspond to adjacent domain values (e.g., when the two values are produced as left and right children in a subtree). Through this leakage, the adversary may infer that, e.g., two ciphertexts are employee records with adjacent salary intervals (but these values will remain encrypted obviously). If this leakage information is incorporated to the simulator in the security game, then slight modifications in the proof methodology of R. Curtmola et al. suffice in order to perfectly simulate the real execution DPRF-enhanced SSE framework; despite this moderate privacy loss the scheme offers an exponential improvements in terms of efficiency which from a practical point of view is a more deciding factor.

Broadcast Encryption

In a broadcast encryption scheme, a sender wishes to transmit data to a set of receivers so that at each transmission, the set of receivers excluded from the recipient set can be chosen on the fly by the sender. In particular, this means that the sender has to be able to make an initial key assignment to the recipients and then use the suitable key material so that only the specific set of users of its choosing can receive the message. In such schemes, it was early on observed that there is a natural tradeoff between receiver memory storage and ciphertext length. The intuition behind this is that if the receivers have more keys this gives to the sender more flexibility in the way it can encrypt a message to be transmitted.

In the above sense, one can think of the key assignment step of a broadcast encryption scheme as a PRF defined over the set $\Phi$ which contains all distinct subsets that the broadcast encryption scheme assigns a distinct key. Given this configuration, the user u will have to obtain all the keys corresponding to subsets $S \in \Phi$ for which it holds that $u \in S$ (denoted subsets by $S_u \subseteq \Phi$). In DPRF language, this would correspond to a delegation policy for a PRF: users will need to store the trapdoor that enables the evaluation of any value in the delegated key set $S_N$.

Seen in this way, any DPRF is a key assignment mechanism for a broadcast encryption scheme that saves space on receiver storage. For example, the disclosed construction for ranges gives rise to the following broadcast encryption scheme: receivers [n]={1, . . . , n} are placed in sequence; each receiver u∈[n] is initialized with the trapdoor for a range [u−t,u+t] for some predetermined parameter t∈Z . In this broadcast encryption scheme, the sender can very efficiently enable any range of receivers that is positioned at distance at most t from a fixed location v∈[n]. This is done with a single ciphertext (encrypted with the key of location v). Any receiver of sufficient proximity t to location v can derive the corresponding decryption key from its trapdoor. Furthermore, given the efficiency of the disclosed construction, storage on receivers is only logarithmic on t. While the semantics of this scheme are more restricted than a full-fledged broadcast encryption scheme (which enables the sender to exclude any subset of users on demand), it succinctly illustrates the relation between broadcast encryption and DPRF.

Regarding policy privacy, it is interesting to point out that this security property is yet unstudied in the domain of broadcast encryption. In the present context, policy privacy deals with the privacy of memory contents from the receiver point of view. Maintaining the indistinguishability of the storage contents is a useful security measure in broadcast encryption schemes and the DPRF primitive will motivate the study of this security property in the context of broadcast encryption (note that none of the tree-like key-delegation methods used in prior broadcast encryption schemes work satisfy policy privacy).

CONCLUSION

The delegatable pseudorandom functions (DPRFs) disclosed herein are a new cryptographic primitive that allow for policy-based computation at an untrusted proxy 120 (FIG. 1) of PRF values without knowledge of a secret or even the input values. The core properties of DPRFs are defined for (1) correctness, the ability of the proxy 120 to compute PRF values only for inputs that satisfy a given predicate, (2) security, the standard pseudorandomness guarantee but against a stronger adversary that also issues delegation queries, and (3) policy privacy, preventing leakage of the secret preimages of the computed PRF values. In addition, two DPRF constructions are provided along with an analysis in terms of their security and privacy guarantees and some inherent trade-offs with efficiency. The proposed DPRFs are generic, yet practical, based on the well-understood and widely-adopted GGM design framework for PRFs and they find direct application in many key delegation or derivation settings providing interesting new results.

Figure 8:
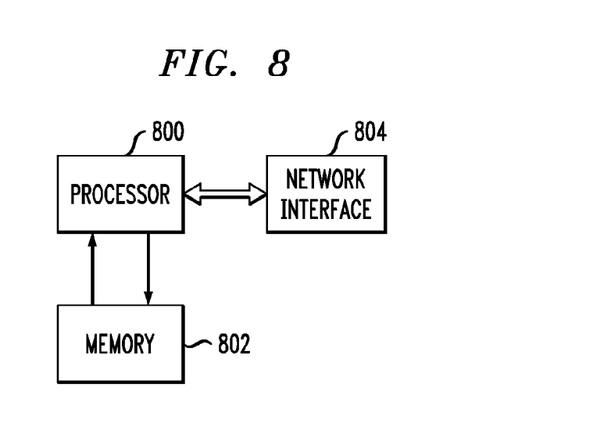
FIG. 8 shows one possible implementation of a given one of the processing devices of FIG. 1.

FIG. 8 shows one possible implementation of a given one of the processing devices of FIG. 1. The device in this implementation includes a processor 800 coupled to a memory 802 and a network interface 804. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, a secure authentication protocol in accordance with the present invention can be implemented at least in part in the form of one or more software programs that are stored in device memory 802 and executed by the corresponding processor 800. The memory 802 is also used for storing information used to perform computations or other operations associated with the secure alerting protocols of the invention.

As previously indicated, the above-described embodiments of the invention are presented by way of illustrative example only. Numerous variations and other alternative embodiments may be used, as noted above. Aspects of the present invention permit delegation of the evaluation of pseudorandom functions to a proxy.

Additional details regarding certain conventional cryptographic techniques referred to herein may be found in, e.g., A. J. Menezes et al., Handbook of Applied Cryptography, CRC Press, 1997, which is incorporated by reference herein.

The illustrative embodiments of the invention as described herein provide for secure delegation of the evaluation of pseudorandom functions to a proxy. Advantageously, the illustrative embodiments do not require changes to existing communication protocols. It is therefore transparent to both existing applications and communication protocols.

It should again be emphasized that the particular authentication, encryption and/or communication techniques described above are provided by way of illustration, and should not be construed as limiting the present invention to any specific embodiment or group of embodiments. For example, as previously noted, the described embodiments may be adapted in a straightforward manner to operate with other types of credentials, encryption and/or authentication information. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. An apparatus for delegating by a delegator evaluation of a pseudorandom function to a proxy, comprising:
   a memory; and
   at least one processing device, coupled to the memory, operative to:
   compute, using said at least one processing device, a trapdoor based on a secret key and a predicate, wherein said predicate defines a plurality of values for which the proxy is authorized to evaluate said pseudorandom function, wherein said plurality of values comprise a subset of a larger domain of values; and
   provide, using said at least one processing device, said trapdoor to said proxy for said proxy to evaluate said pseudorandom function on behalf of said delegator, wherein said trapdoor provides an indication to said proxy of said plurality of values for which the proxy is authorized to evaluate said pseudorandom function.

2. The apparatus of claim 1 wherein said pseudorandom function that is delegated to said proxy generates a pseudorandom function value for at least one of said plurality of values conforming to said predicate.

3. The apparatus of claim 1 wherein said pseudorandom function generates a pseudorandom function value for at least one value in said larger domain and wherein said pseudorandom function values for any value that is not within said plurality of values is unpredictable for said proxy.

4. The apparatus of claim 1 wherein said trapdoor is provided to said proxy using a Gordreich, Goldwasser, Micali (GGM) binary tree comprising a plurality of nodes that are labelled by a binary representation induced by said GGM tree.

5. The apparatus of claim 4 wherein labels of leaf nodes of said GGM tree comprise said larger domain and every leaf node of said GGM tree is associated with a pseudorandom function value for its label.

6. The apparatus of claim 5 wherein said trapdoor is represented by root nodes of one or more sub-trees in said GGM tree that cover a given range of said predicate and said proxy is authorized to evaluate, using said trapdoor, the pseudorandom function values for all leaves within one or more sub-trees.

7. The apparatus of claim 4 wherein said at least one processing device is further configured to determine one or more sub-trees in said GGM tree that cover a given range of said predicate.

8. The apparatus of claim 7 wherein said at least one processing device is further configured to determine two or more of second sub-trees in said GGM tree, wherein a number of said second sub-trees and a level in said GGM tree of root nodes of said second sub-trees depend only on a size of a given range of said predicate, and wherein the root nodes of said second sub-trees are descendants in said GGM tree of the root nodes of said minimum number of sub-trees.

9. The apparatus of claim 4 wherein said at least one processing device is further configured to determine at least two sub-trees in the GGM tree that cover a given range of said predicate, wherein at least two of said sub-trees are anchored on a same level of said GGM tree.

10. The apparatus of claim 4 wherein said plurality of nodes are further associated with pseudorandom values that are based on said binary representation, wherein said pseudorandom value of a given node of said plurality of nodes is based on recursively applying a pseudorandom generator on the pseudorandom value of a parent node of said given node, and wherein said pseudorandom generator is indexed by the label of said given node.

11. The apparatus of claim 10 wherein labels of leaf nodes of said GGM tree comprise said larger domain and said pseudorandom values of said leaf nodes comprise pseudorandom function values defined over said larger domain, and wherein the pseudorandom value of a given leaf node comprises a pseudorandom function value for the label of said given leaf node.

12. The apparatus of claim 4 wherein said trapdoor is represented by a leaf node in said GGM tree wherein said leaf node covers a given singleton range of said predicate.

13. The apparatus of claim 1 wherein said delegator comprises a trusted center and said proxy comprises a radio frequency identification reader and said delegation apparatus is performed for one or more of authentication and access control.

14. The apparatus of claim 1 wherein said delegator comprises a symmetric searchable encryption (SSE) client and said proxy comprises an SSE server and said delegation apparatus is performed to generate one or more query tokens.

15. The apparatus of claim 1 wherein said delegation comprises a key assignment mechanism for a broadcast encryption scheme.

16. An apparatus for evaluating by a proxy a pseudorandom function delegated by a delegator, comprising:
a memory; and
at least one processing device, coupled to the memory, operative to:
receive, using said at least one processing device, a trapdoor from said delegator for said proxy to evaluate said pseudorandom function on behalf of said delegator, wherein said trapdoor provides an indication of a plurality of values for which said proxy is authorized to evaluate said pseudorandom function, wherein said plurality of values comprise a subset of a larger domain of values; and
evaluate, using said at least one processing device, an algorithm on said trapdoor to obtain at least one pseudorandom function value for at least one of said plurality of values.

17. The apparatus of claim 16, wherein said algorithm using said trapdoor, executes a number of steps to compute said at least one pseudorandom function value for each of said plurality of values and terminates when said algorithm reaches a final state.

18. The apparatus of claim 16 wherein said pseudorandom function that is delegated to said proxy generates a pseudorandom function value for at least one of said plurality of values conforming to a predicate, wherein said predicate defines said plurality of values for which the proxy is authorized to evaluate said pseudorandom function.

19. The apparatus of claim 18 wherein said proxy can only infer information about said predicate using said trapdoor that is inferred directly by said generated pseudorandom function values.

20. The apparatus of claim 18 wherein said trapdoor is provided to said proxy using a Gordreich, Goldwasser, Micali (GGM) binary tree comprising a plurality of nodes that are labelled by a binary representation induced by said GGM tree.

21. The apparatus of claim 20 wherein labels of leaf nodes of said GGM tree comprise said larger domain and every leaf node of said GGM tree is associated with a pseudorandom function value for its label.

22. The apparatus of claim 21 wherein said trapdoor is represented by the root nodes of one or more sub-trees in said GGM tree that cover a given range of said predicate and said proxy is authorized to evaluate, using said trapdoor, the pseudorandom function values for all leaves within said one or more sub-trees.

23. The apparatus of claim 20 wherein said at least one processing device is further configured to determine one or more sub-trees in said GGM tree that cover a given range of said predicate.

24. The apparatus of claim 20 wherein said at least one processing device is further configured to determine at least two sub-trees in the GGM tree that cover a given range of said predicate, wherein at least two of said sub-trees are anchored on the same level of said GGM tree.

25. The apparatus of claim 20 wherein said plurality of nodes are further associated with pseudorandom values that are based on said binary representation, wherein said pseudorandom value of a given node of said plurality of nodes is based on recursively applying a pseudorandom generator on the pseudorandom value of a parent node of said given node, and wherein said pseudorandom generator is indexed by the label of said given node.

26. The apparatus of claim 25 wherein said trapdoor comprises a level and a pseudorandom value associated with a root node of one or more sub-trees in said GGM tree that cover a given range of said predicate, wherein said proxy is authorized to evaluate, using said trapdoor, the pseudorandom function values for all leaf nodes within said one or more sub-trees.

27. The apparatus of claim 25 wherein said trapdoor comprises a level and a pseudorandom value associated with a root node of two or more sub-trees in said GGM tree that cover a given range of said predicate, wherein a number of said sub-trees and a level in said GGM tree of the root nodes of said sub-trees depend only on a size of a given range of said predicate, and wherein said proxy is authorized to evaluate, using said trapdoor, the pseudorandom function values for all leaf nodes within said two or more sub-trees.

28. The apparatus of claim 16 wherein said pseudorandom function generates a pseudorandom function value for at least one value in said larger domain and wherein said pseudorandom function values for any value that is not within said plurality of values is unpredictable for said proxy.

29. The apparatus of claim 16 wherein said proxy can only infer information about said larger domain of values that are within said plurality of values using said trapdoor.

30. The apparatus of claim 16 wherein said delegator comprises a trusted center and said proxy comprises a radio frequency identification reader and said delegation apparatus is performed for one or more of authentication and access control.

31. The apparatus of claim 16 wherein said delegator comprises a symmetric searchable encryption (SSE) client and said proxy comprises an SSE server and said delegation apparatus is performed to generate one or more query tokens.

32. The apparatus of claim 16 wherein said delegation comprises a key assignment mechanism for a broadcast encryption scheme.

33. A method by a delegator for delegating evaluation of a pseudorandom function to a proxy, comprising:

computing, using at least one processing device, a trapdoor based on a secret key and a predicate, wherein said predicate defines a plurality of values for which the proxy is authorized to evaluate said pseudorandom function, wherein said plurality of values comprise a subset of a larger domain of values; and providing, using said at least one processing device, said trapdoor to said proxy for said proxy to evaluate said pseudorandom function on behalf of said delegator, wherein said trapdoor provides an indication to said proxy of said plurality of values for which the proxy is authorized to evaluate said pseudorandom function.

34. A computer program product comprising a non-transitory machine-readable storage medium having encoded therein executable code of one or more software programs, wherein the one or more software programs when executed by a delegator for delegating evaluation of a pseudorandom function to a proxy perform the following steps:

computing, using at least one processing device, a trapdoor based on a secret key and a predicate, wherein said predicate defines a plurality of values for which the proxy is authorized to evaluate said pseudorandom function, wherein said plurality of values comprise a subset of a larger domain of values; and providing, using said at least one processing device, said trapdoor to said proxy for said proxy to evaluate said pseudorandom function on behalf of said delegator, wherein said trapdoor provides an indication to said proxy of said plurality of values for which the proxy is authorized to evaluate said pseudorandom function.

35. A method by a proxy for evaluating a pseudorandom function delegated by a delegator, comprising:

receiving, using at least one processing device, a trapdoor from said delegator for said proxy to evaluate said pseudorandom function on behalf of said delegator, wherein said trapdoor provides an indication of a plurality of values for which said proxy is authorized to evaluate said pseudorandom function, wherein said plurality of values comprise a subset of a larger domain of values; and evaluating, using said at least one processing device, an algorithm on said trapdoor to obtain at least one pseudorandom function value for at least one of said plurality of values.

36. A computer program product comprising a non-transitory machine-readable storage medium having encoded therein executable code of one or more software programs, wherein the one or more software programs when executed by a proxy for evaluating a pseudorandom function delegated by a delegator perform the following steps:

receiving, using at least one processing device, a trapdoor from said delegator for said proxy to evaluate said pseudorandom function on behalf of said delegator, wherein said trapdoor provides an indication of a plurality of values for which said proxy is authorized to evaluate said pseudorandom function, wherein said plurality of values comprise a subset of a larger domain of values; and evaluating, using said at least one processing device, an algorithm on said trapdoor to obtain at least one pseudorandom function value for at least one of said plurality of values.

* * * * *

UNITED STATES PATENT AND TRADEMARK OFFICE
CERTIFICATE OF CORRECTION

| | | |
|---|---|---|
| PATENT NO. | : 9,712,320 B1 | Page 1 of 1 |
| APPLICATION NO. | : 13/931939 | |
| DATED | : July 18, 2017 | |
| INVENTOR(S) | : Kiayias et al. | |

It is certified that error appears in the above-identified patent and that said Letters Patent is hereby corrected as shown below:

On the Title Page

Item (73), replace "Armonk, NY" with --Hopkinton, MA--

Signed and Sealed this
Eleventh Day of October, 2022

Katherine Kelly Vidal
*Director of the United States Patent and Trademark Office*